United States Patent
Hsu et al.

(10) Patent No.: US 7,382,068 B2
(45) Date of Patent: Jun. 3, 2008

(54) SPINDLE MOTOR AND STATOR STRUCTURE THEREOF

(75) Inventors: Chin-Chu Hsu, Taoyuan Hsien (TW); Chia-Ching Weng, Taoyuan Hsien (TW); Tsung-Ju Yang, Taoyuan Hsien (TW)

(73) Assignee: Delta Electronics, Inc, Taoyuan Hsien (TW)

( * ) Notice: Subject to any disclaimer, the term of this patent is extended or adjusted under 35 U.S.C. 154(b) by 0 days.

(21) Appl. No.: 11/400,215

(22) Filed: Apr. 10, 2006

(65) Prior Publication Data

US 2006/0186744 A1 Aug. 24, 2006

Related U.S. Application Data

(63) Continuation-in-part of application No. 11/007,191, filed on Dec. 9, 2004, now abandoned.

(30) Foreign Application Priority Data

Mar. 15, 2004 (TW) ............... 93106820 A (51) Int. Cl.
*H02K 5/24* (2006.01)
(52) U.S. Cl. ............ 310/51; 310/91; 310/67 R; 310/254
(58) Field of Classification Search .......... 310/51, 310/67 R, 254, 258, 259, 91
See application file for complete search history.

(56) References Cited

U.S. PATENT DOCUMENTS

| | | | | |
|---|---|---|---|---|
| 1,688,891 A | * | 10/1928 | Speen ............... | 310/51 |
| 2,207,251 A | * | 7/1940 | Guedon ............. | 310/157 |
| 3,230,404 A | * | 1/1966 | Graham ............. | 310/51 |
| 5,334,895 A | * | 8/1994 | Morioka et al. ..... | 310/67 R |
| 5,694,268 A | | 12/1997 | Dunfield et al. | |
| 5,798,887 A | | 8/1998 | Yoshida et al. | |
| 5,844,748 A | * | 12/1998 | Dunfield et al. ..... | 360/99.08 |
| 5,847,476 A | | 12/1998 | Elsing et al. | |
| 5,965,966 A | | 10/1999 | Aiello et al. | |
| 6,160,331 A | * | 12/2000 | Morreale ........... | 310/51 |
| 6,765,329 B2 | * | 7/2004 | Wolters ............. | 310/91 |
| 6,809,898 B1 | * | 10/2004 | Prochazka .......... | 360/99.08 |

FOREIGN PATENT DOCUMENTS

| JP | 2001-069717 | 3/2001 |
|---|---|---|
| JP | 2002-101606 | 4/2002 |
| JP | 2002-112517 | 4/2002 |

* cited by examiner

*Primary Examiner*—Dang D Le
(74) *Attorney, Agent, or Firm*—Muncy, Geissler, Olds & Lowe, PLLC (57) ABSTRACT

A spindle motor includes a stator structure and a rotor structure coupled to the stator structure. The stator structure has a stator base, a magnetic conductive structure surrounding the stator base, and a first buffer structure provided in the gap defined by the stator base and the magnetic conductive structure and in contact with both the stator base and the magnetic conductive structure. Furthermore, a second buffer structure and a third buffer structure are respectively provided between the stator base and the casing and between the stator base and the base plate.

22 Claims, 8 Drawing Sheets

FIG. 8 though the casing 220, a shaft (not shown) is located at its
SPINDLE MOTOR AND STATOR STRUCTURE THEREOF

CROSS REFERENCE TO RELATED APPLICATION

The invention is a continuous in part of the application filed on Dec. 9, 2004, now abandoned with an application Ser. No. 11/007,191 and entitled "SPINDLE MOTOR AND STATOR STRUCTURE THEREOF".

BACKGROUND OF THE INVENTION

1. Field of the Invention

The present invention relates to a spindle motor and stator structure thereof and, more particularly, to a spindle motor and stator structure thereof having reduced vibrations and noises during operation.

2. Description of the Related Art

Figure 1:
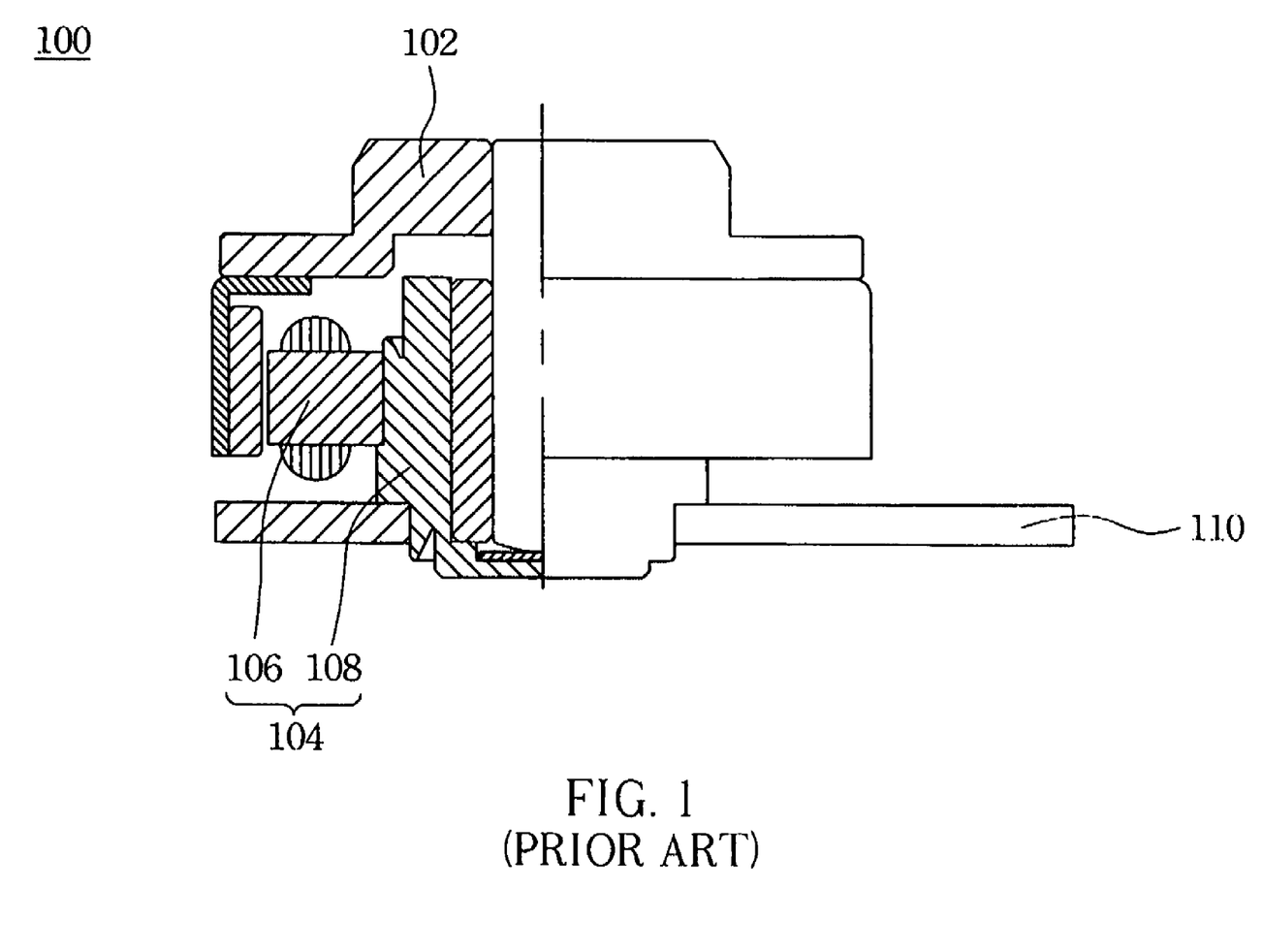
FIG. 1 is a schematic diagram illustrating a conventional spindle motor.

Referring to FIG. 1, a conventional spindle motor 100 includes a rotor 102 and a stator 104 riveted on a base 110. The stator 104 consists of silicon steel sheets 106 and a stator base 108, which are riveted together.

However, when the spindle motor 100 runs, the silicon steel sheets 106 is liable to vibrate due to the attraction of the rotor 102. In that case, since no damping mechanism is incorporated in the stator structure 104 of the conventional spindle motor 100, such vibrations are transmitted to the base 110 through the stator base 108. Further, because the silicon steel sheets 106, the stator base 108, and the base 110 are riveted together, there must be gaps existing among them. Under the circumstance, the gaps can further enhance the vibrations of the silicon steel sheets 106, the stator base 108, and the base 110, and thus the noises made by the spindle motor 100 are considerably increased as a result.

BRIEF SUMMARY OF THE INVENTION

In view of this, an object of the invention is to provide a spindle motor having reduced vibrations and noises during operation.

According to the invention, a spindle motor includes a stator structure and a rotor structure coupled to the stator structure. The stator structure has a stator base, a magnetic conductive structure surrounding the stator base, and a buffer structure provided in the gap defined by the stator base and the magnetic conductive structure and in contact with both the stator base and the magnetic conductive structure.

The spindle motor further comprises an additional buffer structure respectively provided between the stator base and a base plate connected to the stator base. In additional, a holding member can alternatively be set on a side of the stator base of the spindle motor to support and fix the additional buffer structures.

Through the design of the invention, since the stator base and the magnetic conductive structure are connected by the buffer structure, which can absorb the vibrations resulting from the rotation of the rotor structure and prevent it from being transmitted to the stator base, the casing and the base plate, the vibrations and noises are considerably reduced as the spindle motor runs.

DETAILED DESCRIPTION OF THE INVENTION

Figure 2:
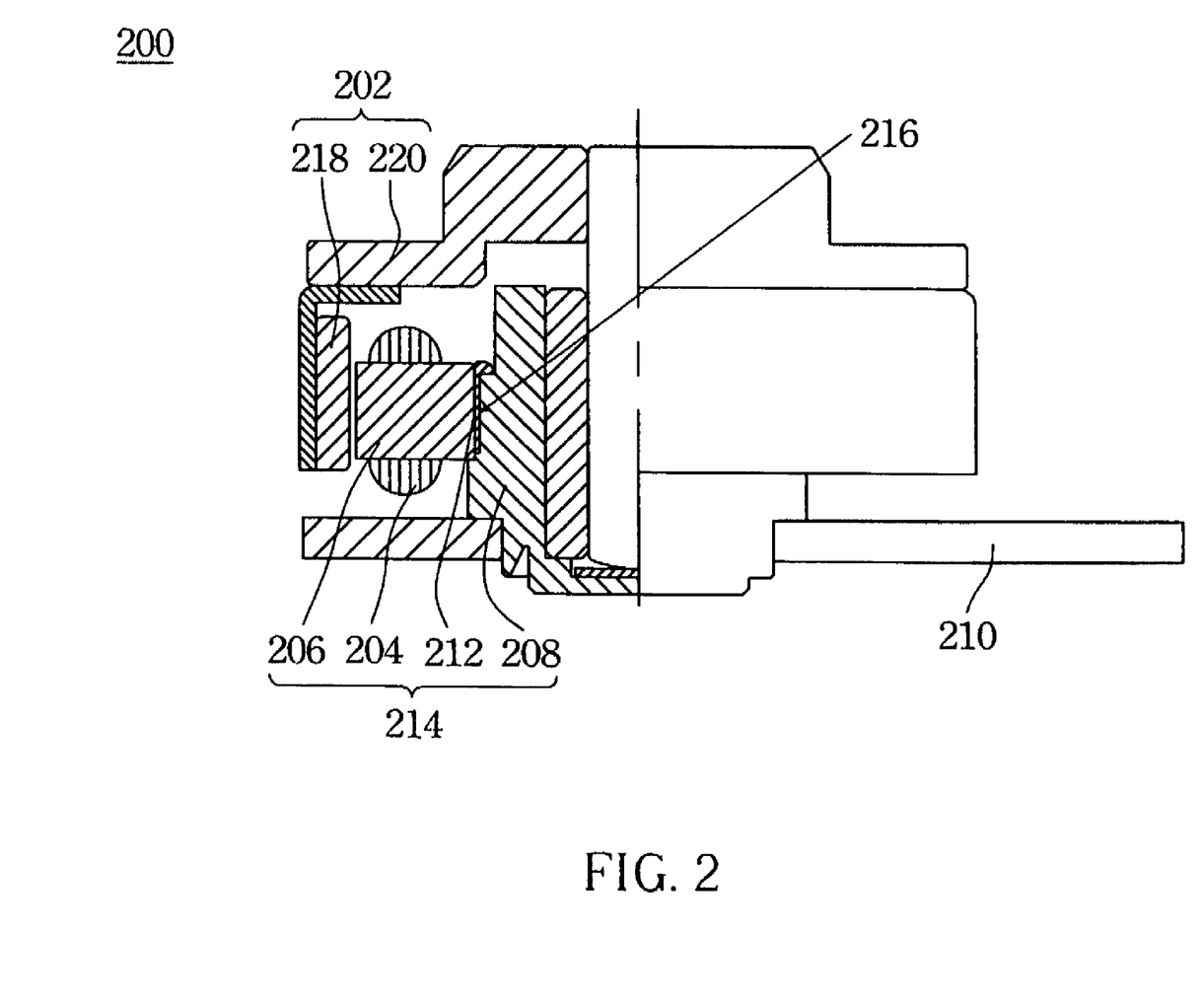
FIG. 2 is a schematic diagram illustrating a spindle motor according to an embodiment of the invention.

FIG. 2 illustrates a spindle motor 200 including a rotor structure 202 and a stator structure 214. The stator structure 214 includes a magnetic conductive structure 206 and stator base 208, and a gap 216 is defined therebetween by both of them. A buffer structure is provided in the gap 216 between the magnetic conductive structure 206 and the stator base 208.

The rotor structure 202, which includes a casing 220 and a magnetic structure 218 affixed to the underside of the casing 220, encloses the stator structure 214. The magnetic interaction induced between the stator structure 214 and the magnetic structure 218 of the rotor structure 202 causes the rotations of the rotor structure 202 and other structures linked to it, such as a blade, mounting plate and a disk. Inside the casing 220, a shaft (not shown) is located at its center and deeply inserted in the stator base 208 to allow the rotor structure 202 to rotate about it. The magnetic structure 218 can be a magnetic tape having more than two magnetic poles, with two adjacent poles being in opposite polarity. The casing 220 can be made of metal, plastic, or magnetic conductive materials.

The stator structure 214 includes a stator base 208, a magnetic conductive structure 206, a coil 204, and a buffer structure provided in the gap defined by the stator base 208 and the magnetic conductive structure 206 and in contact with both of them. In this embodiment, an adhesive substance 212 is utilized to form the buffer structure.

The stator base 208 has a cylindrical body extending along the axial direction of the spin motor 200, and the cylindrical body is used for accommodating the shaft. The magnetic conductive structure 206 is placed around the cylindrical body and formed with a plurality of magnetic poles whose number corresponds to the magnetic poles of the magnetic structure 218. The magnetic conductive structure 206 surrounding the stator base 208 can be connected to it. The coil 204 is wrapped around the magnetic conductive structure 206, so that the magnetic polarity and strength can be controlled by the direction and amplitude of the current flowing through the coil 204. The magnetic conductive structure 206 can be a silicon steel sheet, and the stator base 208 can be made of plastic, metal or a non-magnetic conductive material.

The adhesive substance 212 is filled in the gap 216 defined by the stator base 208 and the magnetic conductive structure 206 to form a connection. The adhesive substance 212 can fill the gap to the full or partially with cavities or bubbles remained therein, as long as the adhesive substance 212 both contacts the stator base 208 and the magnetic conductive structure 206. The adhesive substance 212 is filled in the gap by dispensing, filling, adhering, or engaging, and the adhesive substance 212 can be made of resin, rubber, a foaming material, or an adhesive material.

There are several ways to assemble the adhesive substance 212, stator base 208 and the magnetic conductive structure 206 together. For example, the stator base 208 or the magnetic conductive structure 206 can be first covered with adhesive substance 212, and then the magnetic conductive structure 206 is mounted on the stator base 208. Alternatively, the adhesive substance 212 can be applied on both the stator base 208 and the magnetic conductive either before or after they have been assembled.

According to the invention, since the stator base 208 and the magnetic conductive structure 206 are connected by the adhesive substance 212, the adhesive substance 212 can absorb the vibration resulting from the rotation of the rotor structure 202 to prevent such vibration from being transmitted to the stator base 208 and the base plate 210. Therefore, as the spindle motor 200 runs, the vibrations and noises are considerably reduced.

Figure 3:
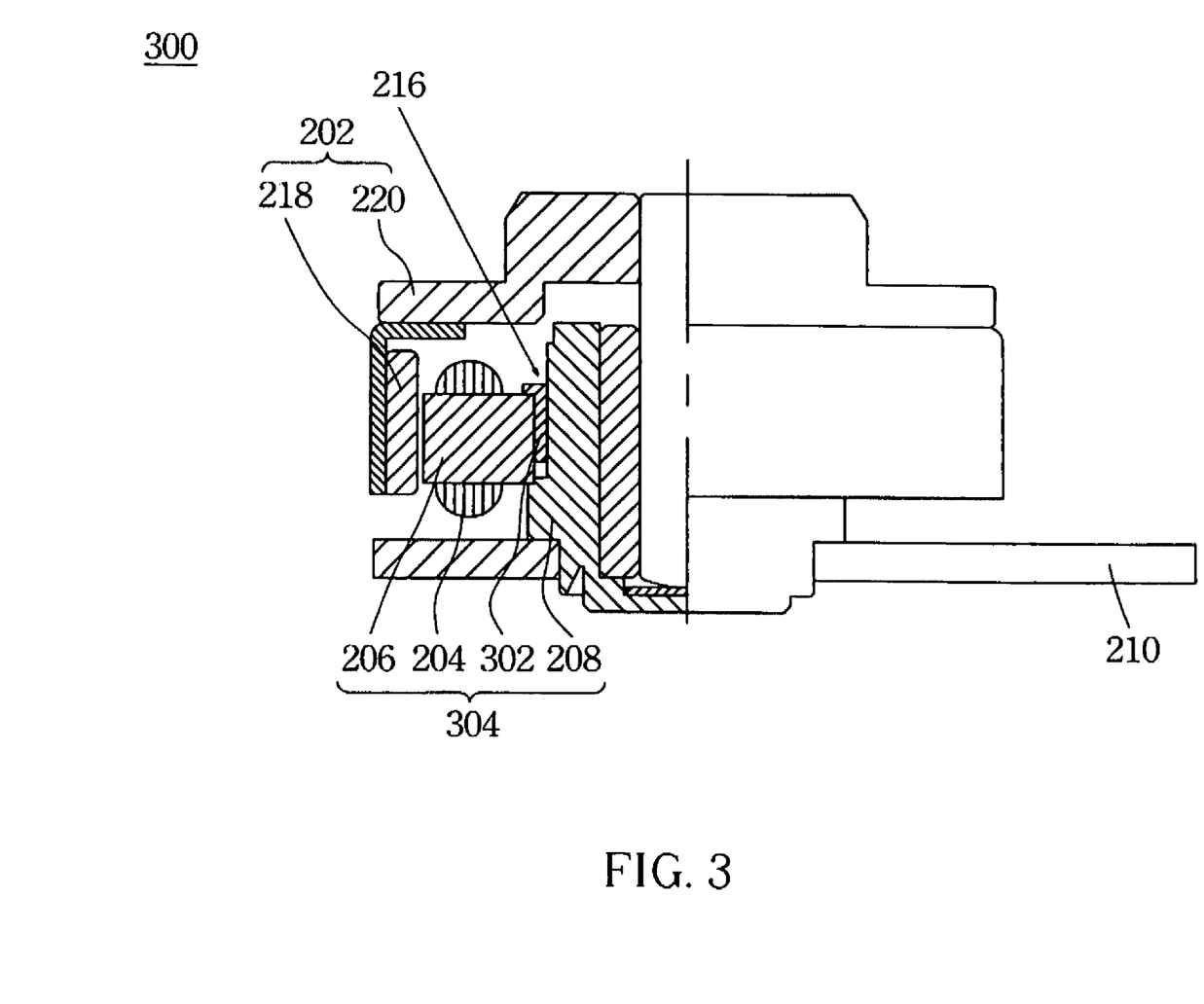
FIG. 3 is a schematic diagram illustrating a spindle motor according to another embodiment of the invention.

FIG. 3 illustrates a spindle motor 300 according to a second embodiment of the invention. This embodiment differs from the first embodiment in that the buffer structure in the stator structure 304 is a flexible member 302. The flexible member 302 can be made of rubber or elastic materials. The assembling methods for the flexible member 302, the stator base 208, and the magnetic conductive structure 206 are similar to those mentioned in the first embodiment, and thus such details are omitted in the description.

According to this embodiment, because the flexible member has high resilience, the buffer structure can absorb the vibrations and eliminate the noises more effectively.

Figure 4:
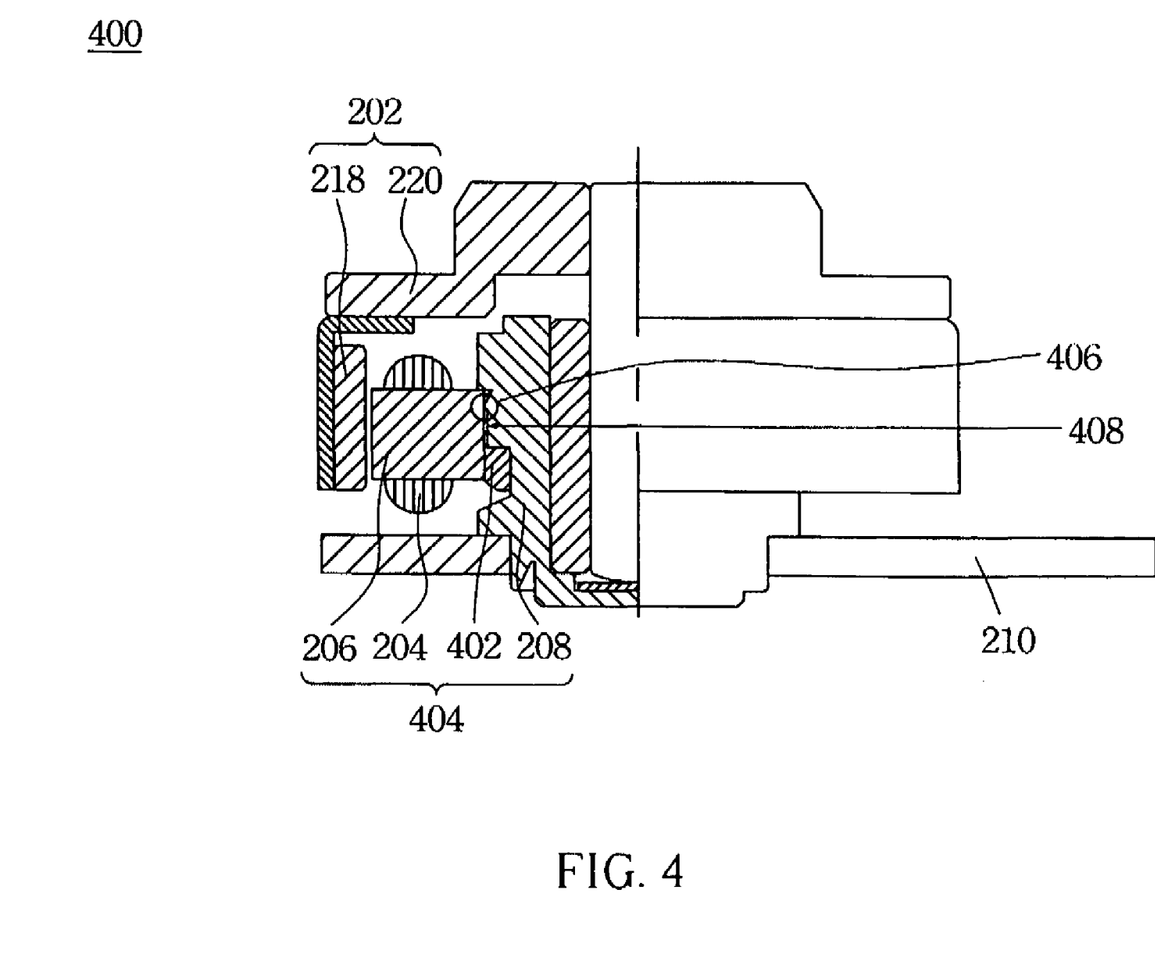
FIG. 4 is a schematic diagram illustrating a spindle motor according to another embodiment of the invention.

FIG. 4 illustrates a spindle motor 400 according to a third embodiment of the invention. The third embodiment differs from the aforesaid embodiments in that the buffer structure in the stator structure 404 is a filling substance 402, and that a positioning part 406 is formed between the stator base 208 and the magnetic conductive structure 206. The positioning part 406 can be either formed on the sidewall of the magnetic conductive structure 206 facing the stator base 208 or on the sidewall of the stator base 208 facing the magnetic conductive structure 206, or both.

Since the positioning part 406 is naturally formed as a projection, an additional engaging force is provided when the projection engages with the filling substance 402. The filling substance 402 can be made of foaming materials or filling materials. Further, the positioning part 406 can be in contact with both the magnetic conductive structure 206 and the stator base 208 to position them.

Also, the opening of the space 408 between the stator base 208 and the magnetic conductive structure 206 can be either faced down (faced opposite to the rotor structure 202) or faced up (faced towards the rotor structure 202), as shown in FIG. 4. As the opening of the space 408 is faced down, the engaging force provided by the positioning part 406 can prevent the filling substance 402 from leakage.

Figure 5:
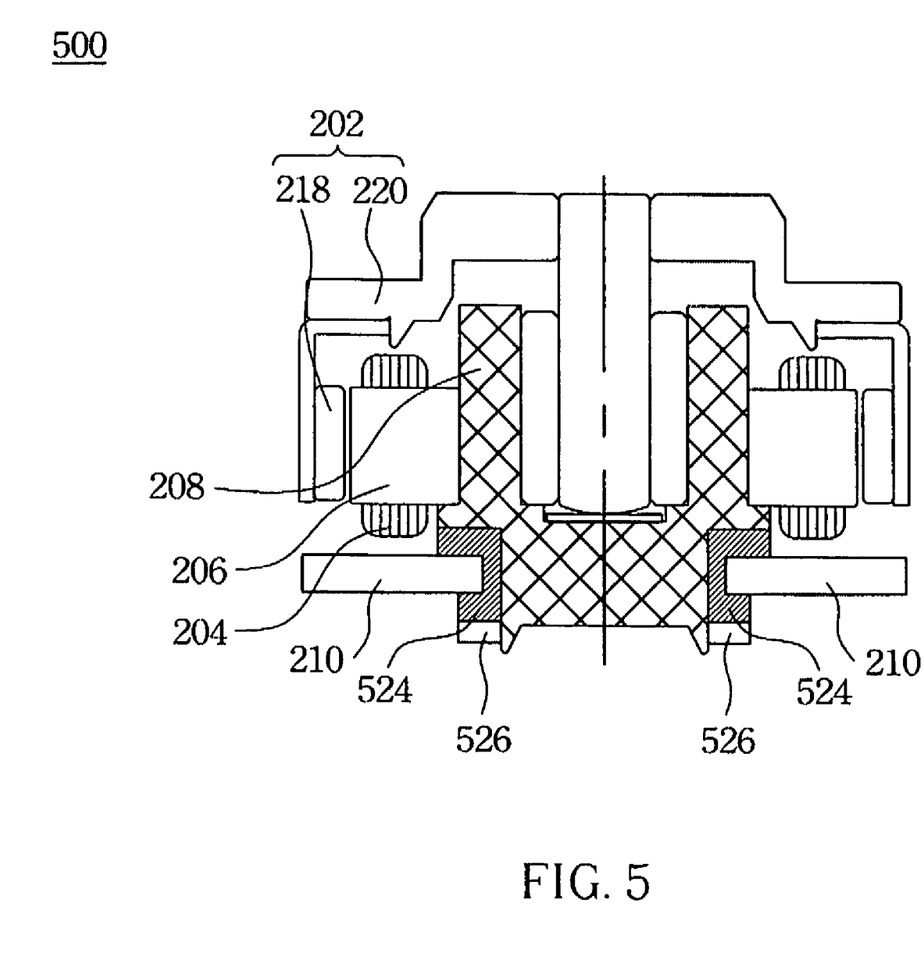
FIG. 5 is a schematic diagram illustrating a spindle motor according to further another embodiment of the invention.

FIG. 5 illustrates a spindle motor 500 according to a fourth embodiment of the invention. The fourth embodiment differs from the aforesaid embodiments in that an additional buffer structure 524 is disposed between the base plate 210 and the stator base 208. The buffer member 524 is mounted between the stator base 208 and the base plate 210 and in contact with both of them. In the embodiment, the buffer member 524 has a C-shaped sectional profile, and wraps the edge of the base plate 210. However, the buffer member can have other shape profile, such as a L-shaped sectional profile or I-shaped sectional profile in the present invention. The buffer member 524 can be made of a mixture of resin, rubber, foaming material, elastic material, adhesive material, filling material, or a mixture thereof.

According to this embodiment, because the buffer member 524 is mounted between the stator base 208 and the base plate 210, the buffer member 524 can further absorb the vibrations being transmitted from the magnetic conductive structure 206 to the stator base 208 and the base plate 210 and eliminate the noises more effectively. 526 is located under the buffer members 524, and the buffer member 524 can be in contact with the side of the holding member 526.

With the installation of the holding member 526, the buffer member 524 can be supported and be effectively fixed to prevent the buffer member 524 from falling off.

According to this embodiment, since the buffer structure can be a filling substance, the buffer structure can absorb the vibrations and eliminate the noises more effectively.

Figure 6:
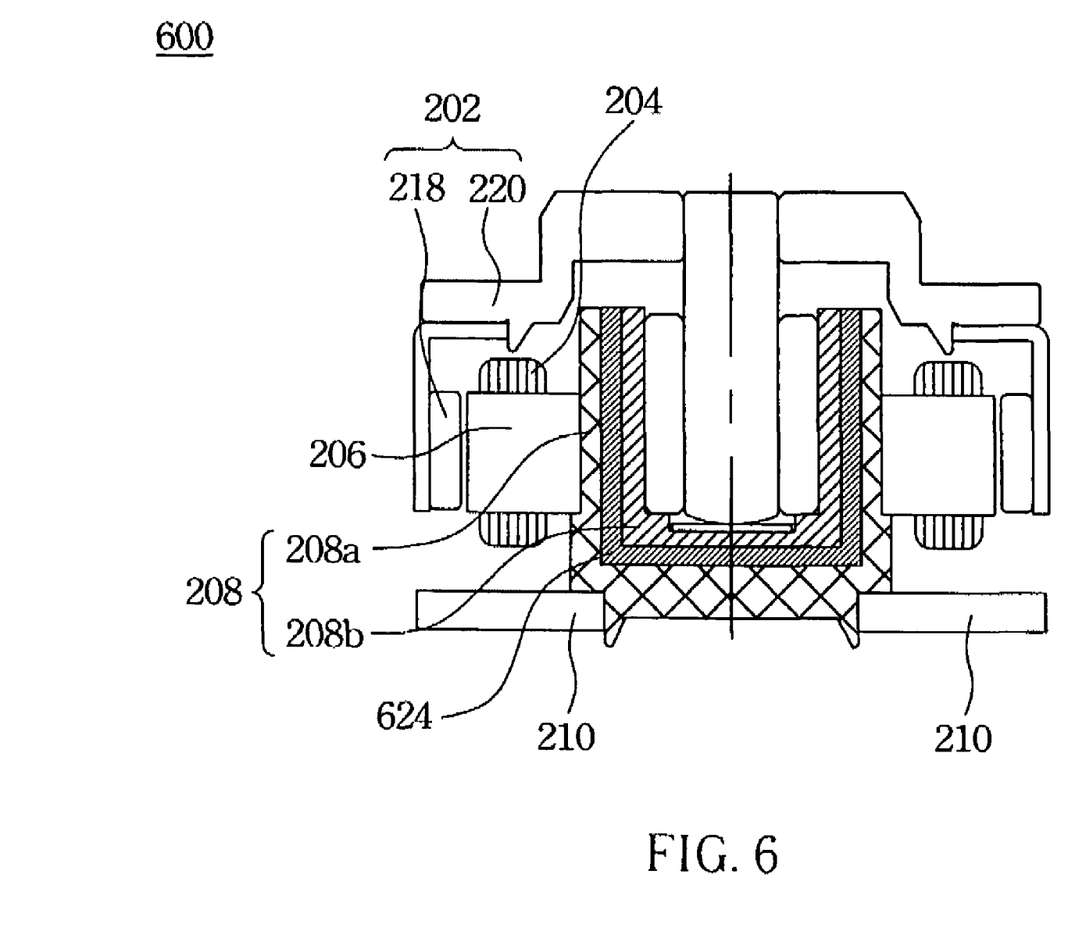
FIG. 6 is a schematic diagram illustrating a spindle motor according to still another embodiment of the invention.

FIG. 6 illustrates a spindle motor 600 according to a fifth embodiment of the invention. The fifth embodiment differs from the aforesaid embodiments in that the stator base 208 is composed of two stator base members 208*a* and 208*b*, and a buffer structure 624 is mounted between the two stator base members 208*a* and 208*b*. Each of the stator base members 208*a* and 208*b* has a U-shaped sectional profile. The buffer structure 624 is attached to the inner sidewall of the stator base member 208*a* and the outer sidewall of the stator base member 208*b* and is sandwiched between the two stator base members 208*a* and 208*b* and in contact with both of them. For example, the buffer structure 624 can have a U-shaped sectional profile.

Figure 7:
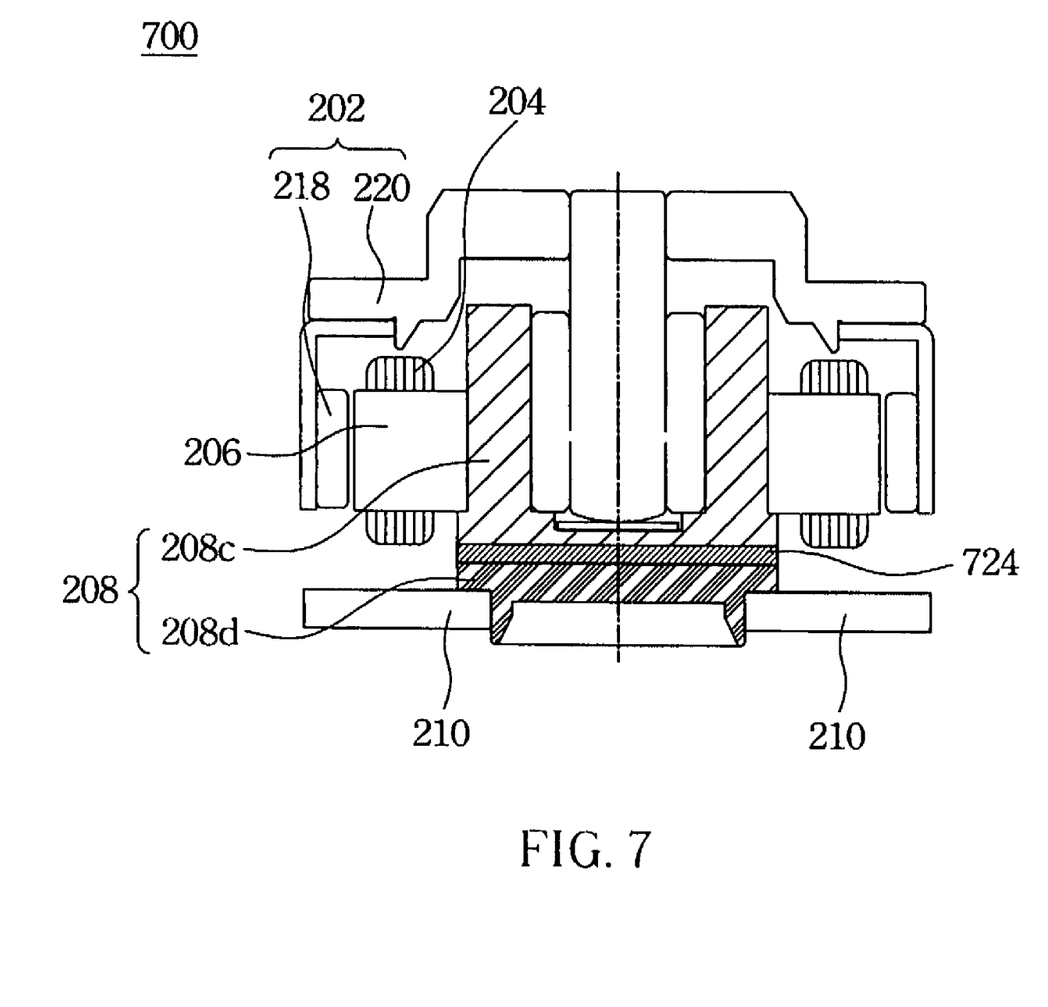
FIG. 7 is a schematic diagram illustrating a spindle motor according to yet another embodiment of the invention.

FIG. 7 illustrates a spindle motor 700 according to a sixth embodiment of the invention. In the spindle motor 700 shown in FIG. 7, the stator base also can be formed by a stator base member 208*c* and a stator base member 208*d* stacked with the stator base member 208*c*. In the present embodiment, a buffer structure 724 is formed between the two stator base members 208*c* and 208*d*. The buffer structure 724 is attached to the upper side of the stator base member 208*d* and bottom side of the stator base member 208*c*, and is sandwiched between the two suitor base members 208*c* and 208*d* and in contact with both of them. For example, the buffer structure 724 can have I-shaped sectional profile. Similarly, the buffer structure 624 or 724 can be made of a mixture of resin, rubber, foaming material, elastic material, adhesive material, filling material, or a mixture thereof.

According to this embodiment, because the buffer structure 624 or 724 is formed between the two stator base members, the buffer structure 624 or 724 can absorb the vibrations being transmitted from the magnetic conductive structure 206 to the stator base 208 and eliminate the noises more effectively.

According to this embodiment, since the buffer structure is a filling substance between the stator base members, the buffer structure can absorb the vibrations and eliminate the noises more effectively.

Figure 8:
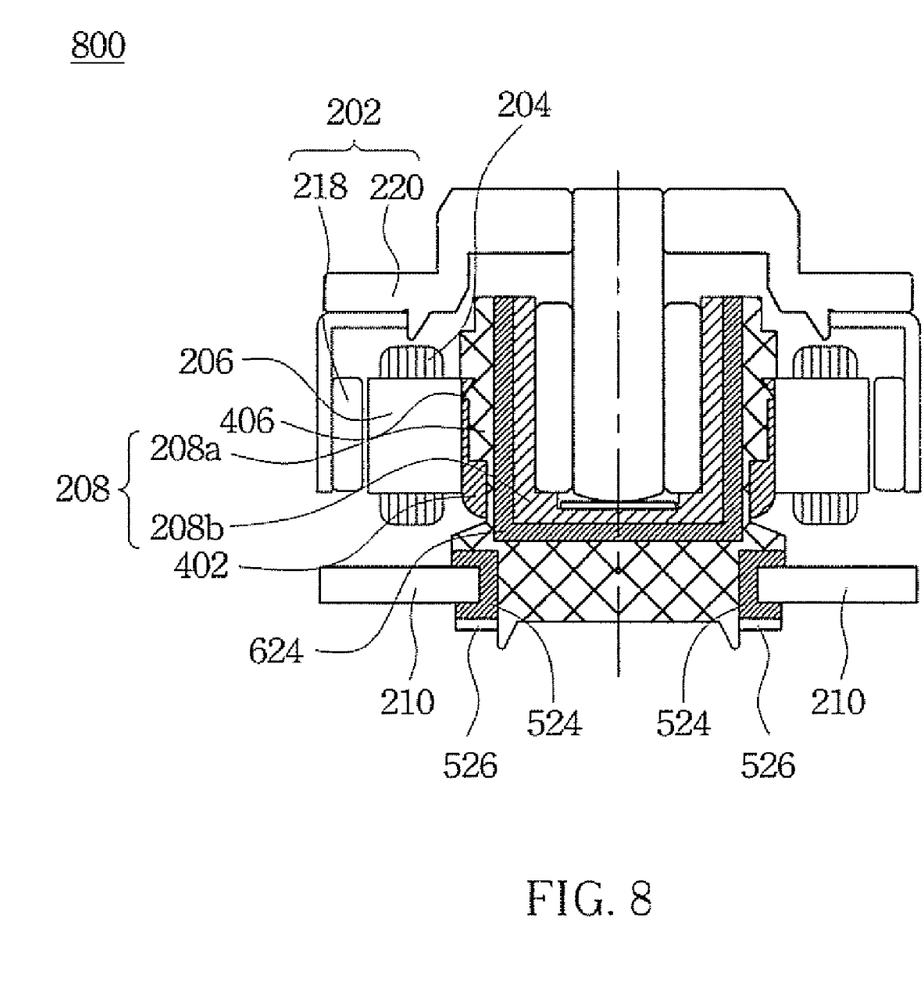
FIG. 8 is a schematic diagram illustrating a spindle motor according to yet another embodiment of the invention.

Although the buffer structures exemplified in the six foregoing embodiments are different, the use of these structures is not limited; in other words, structures in one embodiment can be applied in other embodiments, such as the spindle motor 800 shown in FIG. 8. For example, the filling substance in the third embodiment can be replaced by the flexible member, the adhesive substance, buffer member or all. For another example, the buffer structures 524 and 302 are used in the spindle motor simultaneously.

Further, though the spindle motor 200 is exemplified as an outer-rotor motors, one having ordinary skill in the art should understand that this invention can also be implemented in an inner-rotor motor.

While the invention has been recited by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A spindle motor, comprising:
   a stator structure, comprising:
   a stator base having a closed end; and
   a magnetic conductive structure connected to the stator base;
   a rotor structure coupled to the stator structure;
   a base plate connected with the stator base; and
   a first buffer structure mounted between the stator base and the base plate for absorbing the vibration while the motor operates, wherein the first buffer structure is disposed between the closed end of the stator base and the base plate to wrap the edge of the base plate.

2. The spindle motor as recited in claim 1, wherein the stator base is composed of two stator base members, and the spindle motor further includes at least one second buffer structure formed between the stator base members.

3. The spindle motor as recited in claim 2, wherein one of the stator base members is disposed inside the other stator base member or stacked with the other stator base member.

4. The spindle motor as recited in claim 2, wherein the second buffer structure has a U-shaped or I-shaped sectional profile.

5. The spindle motor as recited in claim 2, wherein the material of the second buffer structure is selected from the group consisting of resin, rubber, foaming material, elastic material, adhesive material, filling material, or a mixture thereof.

6. The spindle motor as recited in claim 1, further comprising a holding member fixed to a side of the stator base, and the holding member is located under the first buffer structure for holding the first buffer structure.

7. The spindle motor as recited in claim 1, further comprising a positioning part which is in contact with the stator base, the magnetic conductive structure or both.

8. The spindle motor as recited in claim 1, further comprising a third buffer structure provided in a gap defined by the stator base and the magnetic conductive structure and in contact with both the stator base and the magnetic conductive structure.

9. The spindle motor as recited in claim 8, wherein an opening of the gap defined by the stator base and the magnetic conductive structure feces towards or opposite to the rotor structure.

10. The spindle motor as recited in claim 8, wherein material of the third buffer structure is selected from the group consisting of resin, rubber, foaming material, elastic material, adhesive material, filling material, or a mixture thereof.

11. The spindle motor as recited in claim 1, wherein the first buffer structure has a C-shaped, L-shaped or I-shaped sectional profile.

12. A spindle motor, comprising:
    a stator structure, comprising:
    a stator base, composed of two stator base members, each having a closed end; and
    a magnetic conductive structure connected to the stator base;
    a rotor structure coupled to the stator structure;
    a base plate connected with the stator base; and
    a first buffer structure mounted between the stator base members.

13. The spindle motor as recited in claim 12, wherein the first buffer structure has a I-shaped sectional profile.

14. The spindle motor as recited in claim 12, wherein one of the stator base members is disposed inside the other stator base member or stacked with the other stator base member.

15. The spindle motor as recited in claim 12, further comprising a positioning part which is in contact with the stator base, the magnetic conductive structure or both.

16. The spindle motor as recited in claim 12, further comprising a second buffer structure provided in a gap defined by the stator base and the magnetic conductive structure and in contact with both the stator base and the magnetic conductive structure.

17. The spindle motor as recited in claim 16, wherein an opening of the gap defined by the stator base and the magnetic conductive structure faces towards or opposite to the rotor structure.

18. The spindle motor as recited in claim 16, wherein material of the first or second buffer structure is selected from the group consisting of resin, rubber, foaming material, elastic material, adhesive material, filling material, or a mixture thereof.

19. A spindle motor, comprising:
    a stator structure, comprising:
    a stator base, composed of two stator base members;
    a magnetic conductive structure connected to the stator base;
    a first buffer structure provided in a gap defined by the stator base and the magnetic conductive structure and in contact with both the stator base and the magnetic conductive structure; and
    a second buffer structure formed between the stator base members;
    a rotor structure coupled to the stator structure;
    a base plate connected with the stator base; and
    a third buffer structure formed between the stator base and the base plate to wrap an edge of the base pate, wherein the first buffer structure, the second buffer structure and the third buffer structure absorb the vibration while the motor operates.

20. The spindle motor as recited in claim 19, wherein the first, second or third buffer structure has a C-shaped, L-shaped, U-shaped or I-shaped sectional profile, and is made of resin, rubber, foaming material, elastic material, adhesive material, filling material, or a mixture thereof.

21. A spindle motor, comprising:
    a stator structure, comprising:
    a stator base, composed of two stator base members;
    a magnetic conductive structure connected to the stator base;
    a first buffer structure provided in a gap defined by the stator base and the magnetic conductive structure and in contact with both the stator base and the magnetic conductive structure;
    a positioning part engaging with the first buffer structure; and
    a rotor structure;
    wherein the stator structure is disposed in the rotor structure.

22. A spindle motor, comprising:
a stator structure, comprising:
- a suitor base having a closed end, composed of a first stator base member and a second stator base member; and
- a magnetic conductive structure connected to the stator base;
- a rotor structure coupled to the stator structure;
- a base plate mounted around a bottom end of the second stator base member; and
- a first buffer structure mounted between the first stator base member and the second stator base member.

* * * * *